(12) United States Patent
Raju (10) Patent No.: US 8,601,899 B2
(45) Date of Patent: Dec. 10, 2013

(54) HYBRID SERIAL-PARALLEL LINKAGE BASED SIX DEGREES OF FREEDOM ROBOTIC MANIPULATOR

(75) Inventor: G. Jagannath Raju, Bangalore (IN)

(73) Assignee: Systemantics India Pvt. Ltd., Bangalore (IN)

(*) Notice: Subject to any disclaimer, the term of this patent is extended or adjusted under 35 U.S.C. 154(b) by 252 days.

(21) Appl. No.: 13/113,932

(22) Filed: May 23, 2011

(65) Prior Publication Data

US 2011/0290061 A1    Dec. 1, 2011

(30) Foreign Application Priority Data

May 25, 2010 (IN) .......................... 1428/CHE/2010

(51) Int. Cl.
*B25J 17/00* (2006.01)
(52) U.S. Cl.
USPC .......... 74/490.05; 74/490.06; 901/23; 901/27
(58) Field of Classification Search
USPC ............... 74/490.01, 490.02, 490.03, 490.04, 74/490.05, 490.06; 901/14, 15, 16, 17, 18, 901/19, 23, 25, 27, 28, 29
See application file for complete search history.

(56) References Cited

U.S. PATENT DOCUMENTS

| | | | | |
|---|---|---|---|---|
| 4,651,589 A * | 3/1987 | Lambert | ......................... | 74/469 |
| 4,790,718 A * | 12/1988 | Vickers | ......................... | 414/735 |
| 4,806,068 A * | 2/1989 | Kohli et al. | .................... | 414/735 |
| 4,819,496 A * | 4/1989 | Shelef | ......................... | 74/490.03 |
| 4,976,582 A * | 12/1990 | Clavel | ......................... | 414/729 |
| 4,988,244 A * | 1/1991 | Sheldon et al. | ................ | 409/132 |
| 5,279,176 A * | 1/1994 | Tahmasebi et al. | ........ | 74/490.01 |
| 5,333,514 A * | 8/1994 | Toyama et al. | ............. | 74/490.06 |
| 5,388,935 A * | 2/1995 | Sheldon | ......................... | 409/201 |
| 5,401,128 A * | 3/1995 | Lindem et al. | ................ | 409/132 |
| 5,656,905 A * | 8/1997 | Tsai | .......................... | 318/568.21 |
| 5,715,729 A * | 2/1998 | Toyama et al. | ............. | 74/490.03 |
| 6,240,799 B1 * | 6/2001 | Yau | ............................ | 74/490.03 |
| 6,425,303 B1 * | 7/2002 | Brog.ang.rdh et al. | .... | 74/490.03 |
| 6,516,681 B1 * | 2/2003 | Pierrot et al. | .............. | 74/490.01 |
| 6,841,964 B2 * | 1/2005 | Osuka et al. | ............. | 318/568.21 |
| 7,063,300 B2 * | 6/2006 | Billet | ............................ | 248/476 |
| 7,086,307 B2 * | 8/2006 | Gosselin et al. | ........... | 74/490.06 |
| 7,127,962 B2 * | 10/2006 | Angeles et al. | ............. | 74/490.05 |
| 7,637,710 B2 * | 12/2009 | Skutberg et al. | ............ | 414/735 |
| 7,673,537 B2 * | 3/2010 | Lessard et al. | ............. | 74/490.01 |
| 7,971,505 B2 * | 7/2011 | Isobe et al. | ................. | 74/490.05 |
| 8,091,243 B2 * | 1/2012 | Bos | ................................ | 33/1 M |

* cited by examiner

*Primary Examiner* — David M Fenstermacher
(74) *Attorney, Agent, or Firm* — Martine Penilla Group, LLP (57) ABSTRACT

A hybrid robotic manipulator adapted to move objects includes a base and a waist mounted on the base. The waist is configured to rotate on the base. The hybrid robotic manipulator further includes a pair of arms mounted on the waist. Each arm includes an upper arm, a forearm serially coupled to the upper arm at an elbow, and a wrist configured to couple the pair of arms at a distal end through a pair of connecting elements. The wrist further includes an end-effector mounted thereon and configured to grip the object and move the object to a desired position.

7 Claims, 5 Drawing Sheets

PRIOR ART

HYBRID SERIAL-PARALLEL LINKAGE BASED SIX DEGREES OF FREEDOM ROBOTIC MANIPULATOR

TECHNICAL FIELD

This invention relates to robotic manipulators in general, and more particularly, but not exclusively, to hybrid robotic manipulators employing both serial and parallel linkage mechanisms.

BACKGROUND

Commercial and industrial robots are in widespread use for performing complex tasks. Robots perform tasks economically and precisely as compared to human beings. Further, robots are also employed to perform certain jobs that are dangerous, difficult, unsuitable and unsafe for human beings.

The structure of the robots includes kinematic chain having links, actuators and joints, each of which are configured to allow one or more degrees of freedom. Robot mechanisms with six degrees of freedom have been designed, and used in industry for accurately locating an object in a workspace. Conventional mechanisms in robots with six degrees of freedom use either a serial link mechanism or a parallel link mechanism to locate an object. The six degrees of freedom of any solid object include a position of the object's centre of gravity in an orthogonal three dimensional space denoted by x, y, and z co-ordinates, and the object's orientation about the centre of gravity denoted by three angles, often designated as yaw, pitch and roll. Position and orientation are often combined, and are collectively referred to as location.

Serial link mechanisms, which are generally open loop chains, provide for locating an object by means of an arm linkage for position, and a wrist linkage for the orientation. As each successive link in the serial chain is carried by its predecessor, the power required to move each link is compounded by the mass of the actuators powering its successors. Therefore, there is an increase in size and cost of all the actuators except for the last one in the chain. The additional power required does not contribute to the motion of the object being located by the robot. This results in a large ratio of the mass of the robot to the mass of the object or the payload that the robot can locate.

Parallel link mechanisms, which are generally closed loop chains, provide for locating an object by six arm links. In such mechanisms, all the actuators combine to contribute to the motion of the object. However, practically, the space within which the object can be located is limited due to interference of one link with a neighboring link. Parallel link robots have a smaller weight to payload ratio than serial link robots, and are used when their limited workspace is sufficient for the application.

Figure 1:
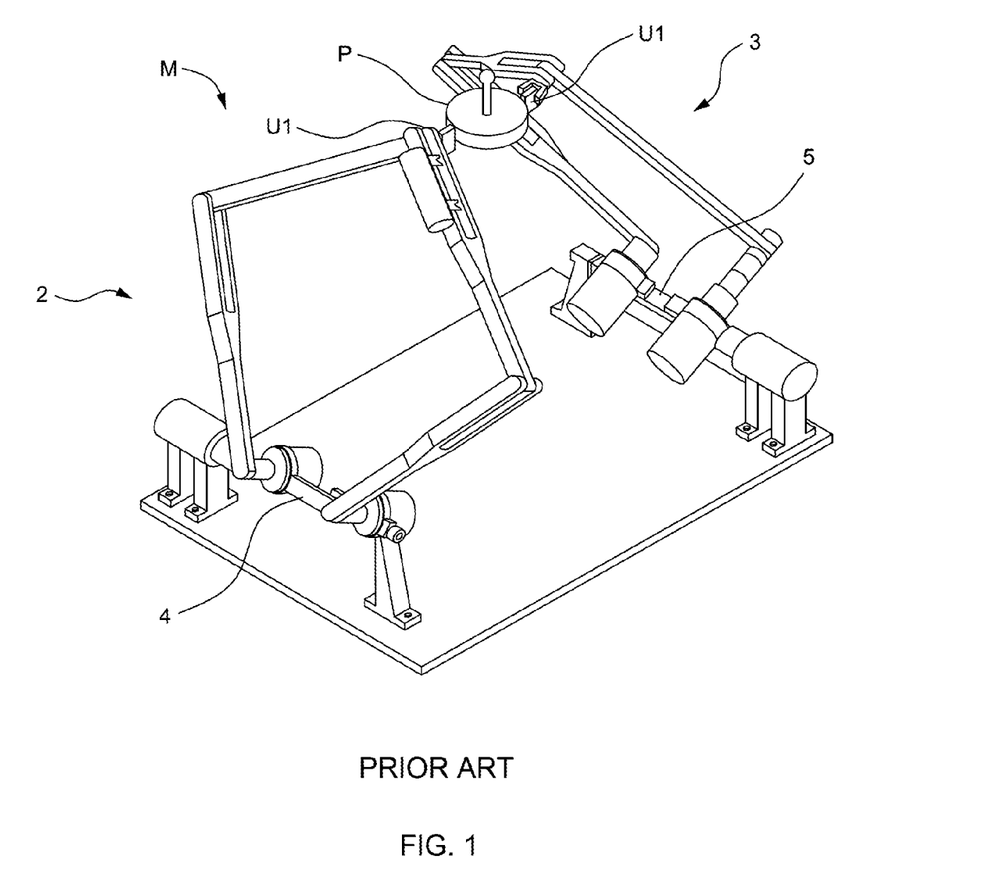
FIG. 1 depicts a robotic manipulator as disclosed in the related art.

Further, attempts have been made to build a manipulator employing a combination of serial link and parallel link mechanisms. One such manipulator is disclosed in a U.S. Pat. No. 6,047,610 granted to Stocco et al. (hereinafter US '610). FIG. 1 shows a structure of a robotic manipulator M having six degrees of freedom as disclosed by US '610. The manipulator M of US '610 includes first and second five-bar linkages 2 and 3 set on a rotatable base 4 and 5, respectively. Each of the five-bar linkages 2 and 3 are attached to a platform P via respective universal joints U2 and U3. Further, it is apparent from FIG. 1 that the links which form the five-bar linkage 2 are serially connected to each other by using serial link mechanism. Similarly, the links which form the five-bar linkage 3 are serially connected to each other by using serial link mechanism. Further, each of the five-bar linkages 2 and 3 is engaged with the platform P so as to form a closed loop chain or a parallel link.

It should be noted that a movement of each of the five-bar linkages 2 and 3 is limited due to interference of link 2 with link 3 and vice versa. Therefore, the amount of workspace maneuvered by the manipulator M, as disclosed in US '610, is substantially less and is identical to that of a parallel link robot.

Therefore, there is a need for a mechanism which enables a robot to maneuver substantially more amount of workspace than a parallel link robot and has a smaller weight to payload ratio than a serial link robot.

BRIEF DESCRIPTION

The principal object is to provide a hybrid robotic manipulator employing both serial and parallel linkage mechanisms.

Another object is to provide a hybrid robotic manipulator with position workspace similar to that of a serial link manipulator, and orientation workspace comparable to that provided by the human wrist.

A further object is to provide a hybrid robotic manipulator having majority of the actuators located closer to the base of the robot, and thereby facilitating use of smaller and cheaper motors to move links of the robot.

BRIEF DESCRIPTION OF FIGURES

This invention is illustrated in the accompanying drawings, in which like reference letters/numerals indicate corresponding parts in the various figures. The embodiments herein will be better understood from the following description with reference to the drawings, in which.

DETAILED DESCRIPTION OF INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 2:
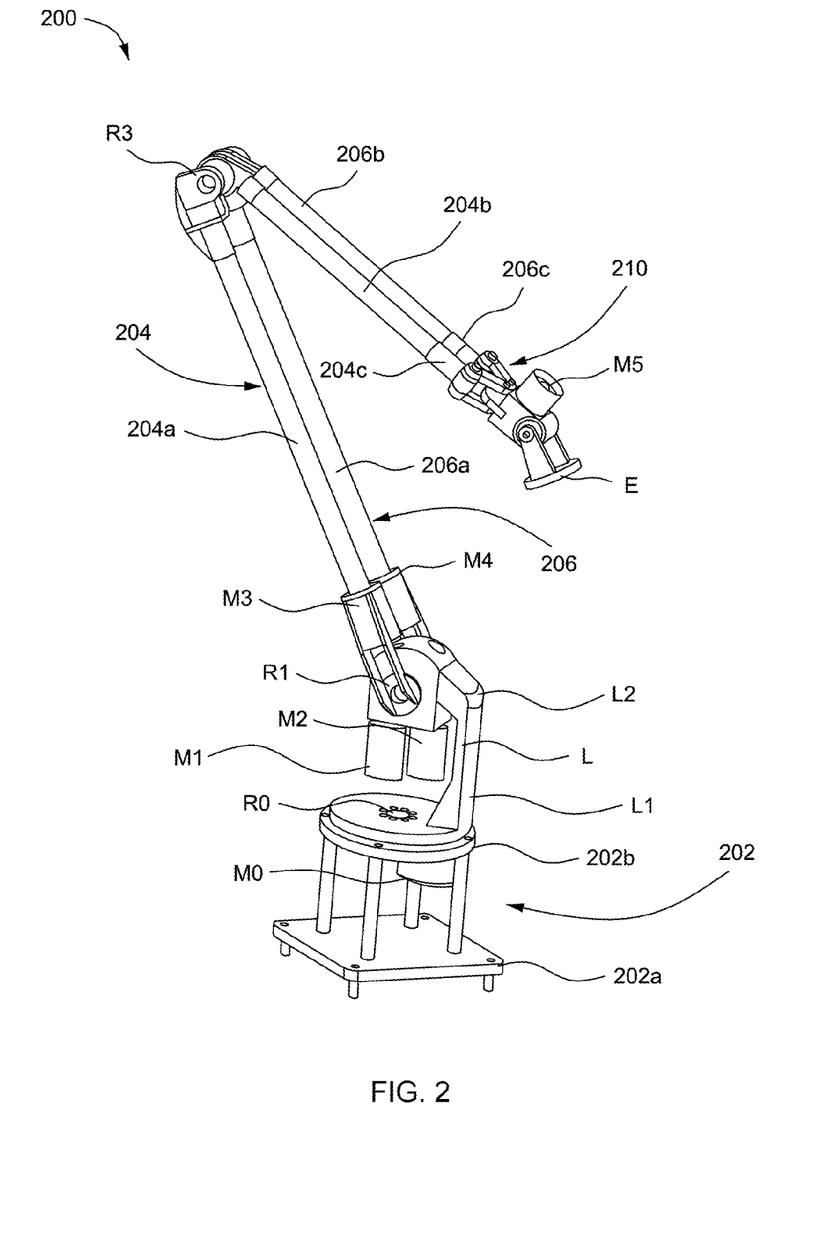
FIG. 2 depicts a hybrid robotic manipulator according to an embodiment as disclosed herein.

FIG. 2 depicts a hybrid robotic manipulator 200 according to an embodiment of the invention. The hybrid robotic manipulator 200 has a base 202 at one end thereof. The base 202 includes a base plate 202a for supporting a housing 202b. The housing 202b is configured to accommodate at least one motor M0 therein. Further, the manipulator 200 includes a waist or a link L provided on the housing 202b. The link L has a lower portion L1 and an upper portion L2. The link L, at the lower portion L1, is connected to the housing 202*b* in a moveable manner via a revolute joint R0. The revolute joint R0 has an axis of rotation perpendicular to the base plate 202*a*. The upper portion L2 of the link L further supports a pair of arms 204 and 206 via respective joints R1 and R2 (not shown). The pair of arms 204 and 206 is coupled to a wrist 210 at a distal end through a pair of connecting elements 204*c* and 206*c* respectively. An axis of rotation of each of the revolute joints R1 and R2 is substantially transverse to the axis of rotation of the revolute joint R0.

The arm 204 includes an upper arm or an upper arm link 204*a* and a fore arm or a fore arm link 204*b*. A first end of the upper arm link 204*a* is pivotally engaged with the revolute joint R1 and a second end of the upper arm link 204*a* is pivotally engaged with an elbow or a revolute joint R3. The revolute joint R3 has an axis of rotation substantially parallel to the axis of rotation of the revolute joint R1. Further, a first end of the fore arm link 204*b* is pivotally engaged with the revolute joint R3 and hence, the first end of the fore arm link 204*b* is connected to the upper arm link 204*a* in a moveable manner. A second end of the fore arm link 204*b* is connected to the connecting element 204*c* via a revolute joint R5 (not shown). An axis of rotation of the revolute joint R5 is transverse to the axis of rotation of the revolute joint R3.

Further, the arm 206 includes an upper arm link 206*a* and a fore arm link 206*b*. A first end of the upper arm link 206*a* is pivotally engaged with the revolute joint R2 (not shown) and a second end of the upper arm link 206*a* is pivotally engaged with an elbow or a revolute joint R4 (not shown). The revolute joint R4 has an axis of rotation substantially parallel to the axis of rotation of the revolute joint R2. Further, a first end of the fore arm link 206*b* is pivotally engaged with the revolute joint R4 and hence, the first end of the fore arm link 206*b* is connected to the upper arm link 206*a* in a moveable manner. A second end of the fore arm link 206*b* is connected to the connecting element 206*c* via a revolute joint R6 (not shown). An axis of rotation of the revolute joint R6 is transverse to the axis of rotation of the revolute joint R4.

Further, movement of the upper arm and the fore arm of each of the pair of arms 204 and 206 are controlled by a plurality of motors. Two motors, M1 and M2 are provided in between the upper portion L2 and the lower portion L1 of the link L. Motor M1 is configured to actuate movement of the upper arm link 204*a* and motor M2 is configured to actuate movement of the upper arm link 206*a*, by rotating the revolute joints R1 and R2 respectively. Further, two motors M3 and M4 are provided on the upper portion L2 of the Link L. Alternatively, the motor M3 may be provided near the first end of the upper arm link 204*a* and the motor M4 may be provided near the first end of the upper arm link 206*a*. The motor M3 is configured to actuate a movement of the fore arm link 204*b* by rotating the revolute joint R3. The motor M4 is configured to actuate a movement of the fore arm link 206*b* by rotating the revolute joint R4.

The manipulator 200 further includes an end effector E connected to the wrist 210. The base 202, the link L, and the arm 204 form an open chain or a serial link. Further, the base 202, the link L, and the arm 206 form another open chain or a serial link. Providing the manipulator 200 with the wrist 210 connected to the arms 204 and 206 via respective connecting elements 204*c* and 206*c* essentially closes the chain, and, in effect, form a parallel link. Therefore, a position workspace of the manipulator 200 is identical to that of a serial link manipulator, and a orientation workspace is comparable to that provided by the human wrist.

Figure 2A:
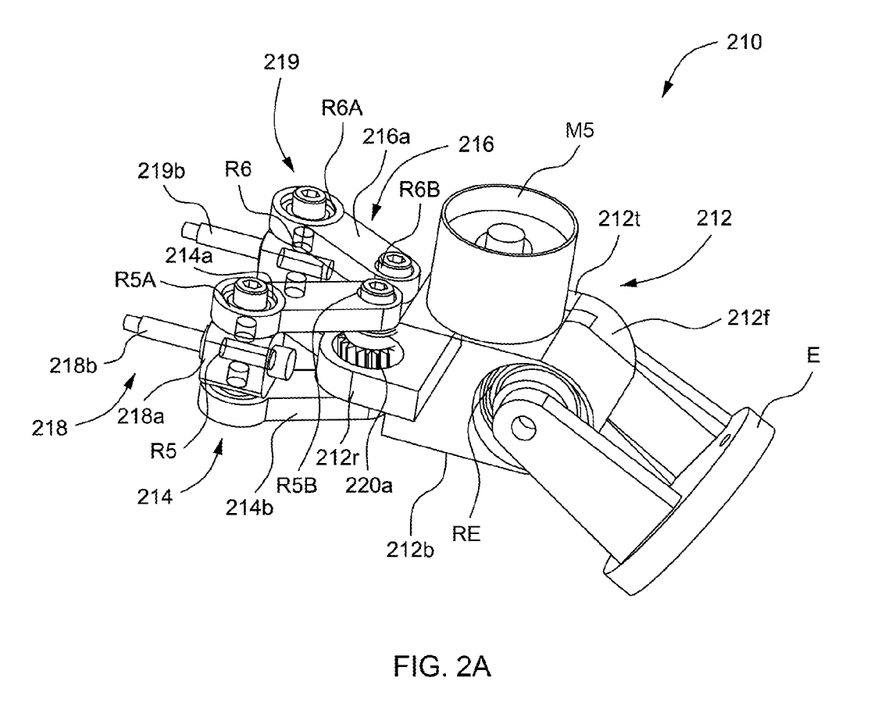
FIG. 2A depicts a wrist portion of the hybrid robotic manipulator as shown in FIG. 2.

The wrist 210 as shown in FIG. 2A, has a casing 212. The casing 212 has a plurality of gears (not shown) therein. The casing 212 further has a top portion 212*t*, a bottom portion 212*b*, a front portion 212*f* and a rear portion 212*r*. Further, the wrist 210 includes a first coupling element 214 having a first top coupling element 214*a*, a first bottom coupling element 214*b*. The wrist 210 further includes a second coupling element 216 having a second top coupling element 216*a* and a second bottom coupling element 216*b* (not shown). At least a first gear and a second gear (not shown) are provided in the rear portion 212*r* of the casing 212. The first gear has a first gear shaft (not shown) for connecting the first gear to the top portion 212*t* and the bottom portion 212*b* of the casing 212 and the second gear has a second gear shaft (not shown) for connecting the second gear to the top portion 212*t* and the bottom portion 212*b* of the casing 212. Further, each of the first and second gears has an axis of rotation along the respective first and second gear shafts and the axis of rotation of first gear is parallel to the axis of rotation of the second gear. The first and second gears provided in the rear portion 212*r* mesh with each other to transmit motion.

A first end of the first top coupling element 214*a* is fastened to the first gear shaft at the top portion 212*t* of the casing 212. A first end of the first bottom coupling element 214*b* is fastened to the first gear shaft at the bottom portion 212*b* of the casing 212. Similarly, a first end of the second top coupling element 216*a* is fastened to the second gear shaft at the top portion 212*t* of the casing 212 and a first end of the second bottom coupling element 216*b* is fastened to the second gear shaft at the bottom portion 212*b* of the casing 212.

Further, the front portion 212*f* of the casing 212 includes a worm drive (not shown) having a worm and a worm gear. The worm has a worm shaft (not shown) for connecting the worm to the top portion 212*t* and the bottom portion 212*r* of the casing 212. An axis of rotation of the worm is parallel to the axis of rotation of the first gear. Further, a worm gear shaft (not shown) connects the worm gear horizontally to the front portion 212*r* of the casing 212. The worm gear has an axis of rotation transverse to the axis of rotation of the worm. The end effector E is connected to the worm gear shaft at the front portion 212*f* of the casing 212. A wrist motor M5 is provided near the top portion 212*t* of the casing for driving the worm of the worm drive.

The wrist 210 further includes a first locking element 218, having a head part 218*a* and a tail part 218*b*, and a second locking element 219 having a head part 219*a* and a tail part 219*b*. The head part 218*a* of the first locking element 218 is pivotally engaged between a second end, which is spaced away from the first end, of the first top coupling element 214*a* and a second end, which is spaced away from the first end, of the first bottom coupling element 214*b*. Similarly, the head part 219*a* of the second locking element 219 is pivotally engaged between a second end, which is spaced away from the first end, of the second top coupling element 216*a* and a second end, which is spaced away from the first end, of the second bottom coupling element 216*b*. The tail part 218*b* of the first locking element 218 is adapted to be engaged with the connecting element 204*c* and the tail part 219*b* of the second locking element 219 is adapted to be engaged with the connecting element 206*c*.

It will be understood by a person having ordinary skill in the art that the first top 214*a* and bottom 214*b* coupling elements may be provided as a unitary member without deterring the intended function as indicated hereinabove. For example, a coupling element having a shape substantially similar to that of a double open-end wrench/spanner may be used in place of the first top 214*a* and bottom 214*b* coupling elements. Similarly, the second top 216*a* and bottom 216*b* coupling elements may be provided as a unitary member.

Further, the end effector E may have different shapes based on the shape and size of the object to be located in a workspace and/or based on the nature of the operation performed by the manipulator 200.

Further, movements associated with the wrist 210 and end effector E are explained as non-limiting examples hereunder. In operation, the motor M0 actuates a rotational movement of the Link L which in turn rotates the arm 204, the arm 206, the wrist 210 and the end effector E. In order for the wrist 210 and the end effector E to define a yawing movement i.e., turning of the wrist 210 from left to right and vice versa, one of the motor M1 and M2 is actuated to move the corresponding upper arm link 204*a* and 206*a*. In this example, the motor M1 is considered to actuate the corresponding upper arm link 204*a*. The upper arm link 204*a* is thereby made to rotate about the axis of the revolute joint R1. The rotation of the upper arm link 204*a* causes the corresponding fore arm link 204*b* to move. Alternatively, the motor M3 may be actuated to move the fore arm link 204*b*. During the movement of the upper arm link 204*a* and the fore arm link 204*b*, the arm 206 remains stationary. Further, the movement of the fore arm link 204*b* moves the locking element 219 forward which in turn moves the coupling element 216 away from the coupling element 214. The movement of the coupling element 216 in turn moves the wrist 210 towards the arm 206 thus resulting in a yawing movement of the wrist 210 and the end effector E.

Further, in order for the end effector E to define a pitching movement i.e., tilting of the end effector E forward and backward or up and down with respect to the wrist 210, the motor M5 is used. The motor M5 actuates a movement of the worm drive which in turn moves the end effector E forward or backward as desired thereby resulting in a pitching movement of the end effector E.

In order for the wrist 210 to define a rolling movement i.e., tilting of the wrist 210 along with the end effector E from side to side, one or both of the connecting elements 204*c* and 206*c* rotates about the axis of the respective revolute joint R5 and R6. The rotation of the connecting elements 204*c* and 206*c* results in the wrist 210 being tilted in the desired direction and thus defining the rolling movement.

Figure 3:
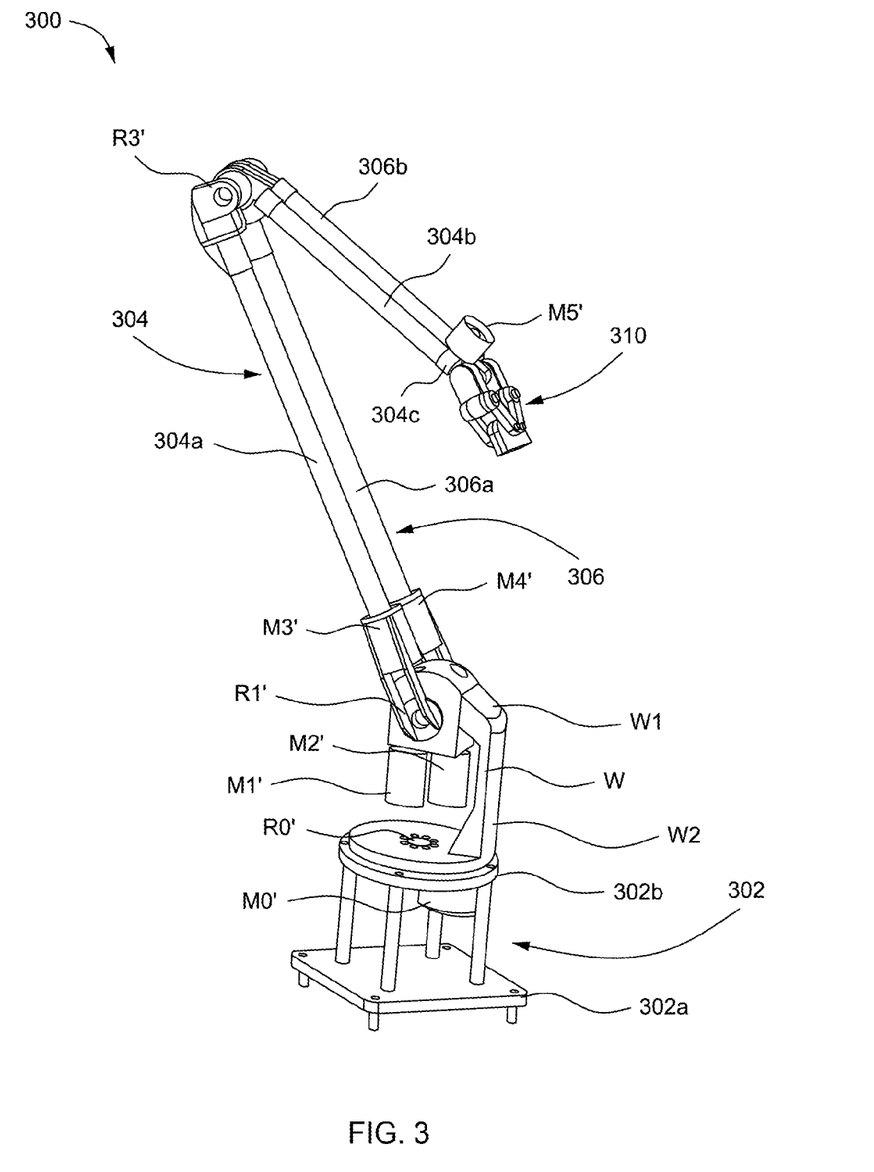
FIG. 3 depicts a hybrid robotic manipulator according to another embodiment.

FIG. 3 depicts a hybrid robotic manipulator 300 according to another embodiment of the invention. The hybrid robotic manipulator 300 has a base 302 at one end thereof. The base 302 includes a base plate 302*a* for supporting a housing 302*b*. The housing 302*b* is configured to accommodate at least one motor M0 therein. Further, the manipulator 300 includes a waist or a link W provided on the housing 302*b*. The link W has a lower portion W1 and an upper portion W2. Link W, at the lower portion W1, is connected to the housing 302*b* in a moveable manner via a revolute joint R0 (not shown). The revolute joint R0 has an axis of rotation perpendicular to the base plate 302*a*. The upper portion W2 of the link W further supports a pair of arms 304 and 306 via respective joints R1 and R2 (not shown). The pair of arms 304 and 306 is coupled to a wrist 310 at a distal end through a pair of connecting elements 304*c* and 306*c* respectively An axis of rotation of each of the revolute joints R1 and R2 is substantially transverse to the axis of rotation of the revolute joint R0.

The arm 304 includes an upper arm or an upper arm link 304*a*, and a fore arm or a fore arm link 304*b*. A first end of the upper arm link 304*a* is pivotally engaged with the revolute joint R1 and a second end of the upper arm link 304*a* is pivotally engaged with an elbow or a revolute joint R3. The revolute joint R3 has an axis of rotation substantially parallel to the axis of rotation of the revolute joint R1. Further, a first end of the fore arm link 304*b* is pivotally engaged with the revolute joint R3 and hence, the first end of the fore arm link 304*b* is connected to the upper arm link 304*a* in a moveable manner. A second end of the fore arm link 304*b* is connected to the connecting element 304*c* via a revolute joint R5 (not shown). An axis of rotation of the revolute joint R5 is transverse to the axis of rotation of the revolute joint R3.

Further, the arm 306 includes an upper arm or an upper arm link 306*a* and a fore arm or a fore arm link 306*b*. A first end of the upper arm link 306*a* is pivotally engaged with the revolute joint R2 (not shown) and a second end of the upper arm link 306*a* is pivotally engaged with an elbow or a revolute joint R4 (not shown). The revolute joint R4 has an axis of rotation substantially parallel to the axis of rotation of the revolute joint R2. Further, a first end of the fore arm link 306*b* is pivotally engaged with the revolute joint R4 and hence, the first end of the fore arm link 306*b* is connected to the upper arm link 306*a* in a moveable manner. A second end of the fore arm link 306*b* is connected to the connecting element 306*c* via a revolute joint R6 (not shown). An axis of rotation of the revolute joint R6 is transverse to the axis of rotation of the revolute joint R4.

Further, movement of the upper arm and the fore arm of each of the pair of arms 204 and 206 are controlled by a plurality of motors. Two motors M1 and M2 are provided in between the upper portion W2 and the lower portion W1 of the link W. The motors M1 is configured to actuate movement of the upper arm link 304*a* by rotating the revolute joint R1. Motor M2 is configured to actuate movement of the upper arm link 306*a* by rotating the revolute joints. Further, two motors M3 and M4 are provided on the upper portion W2 of the Link W. Alternatively, the motor M3 may be provided near the first end of the upper arm link 304*a* and the motor M4 may be provided near the first end of the upper arm link 306*a*. The motor M3 is configured to actuate a movement of the fore arm link 304*b* by rotating the revolute joint R3. The motor M4 is configured to actuate a movement of the fore arm link 306*b* by rotating the revolute joint R4.

The manipulator 300 further includes an end effector E3 (not shown) connected to the wrist 310. The base 300, the link W along with the arm 304 forms an open chain or a serial link. Further, the base 300, the link W along with the arm 306 forms another open chain or a serial link. Providing the manipulator 300 with the wrist 310 connected to the arms 304 and 306 via respective connecting elements 304*c* and 306*c* essentially closes the chain and hence in effect forms a parallel link. Therefore, a position workspace of the manipulator 300 is identical to that of a serial link manipulator, and a orientation workspace is comparable to that provided by the human wrist.

Figure 3A:
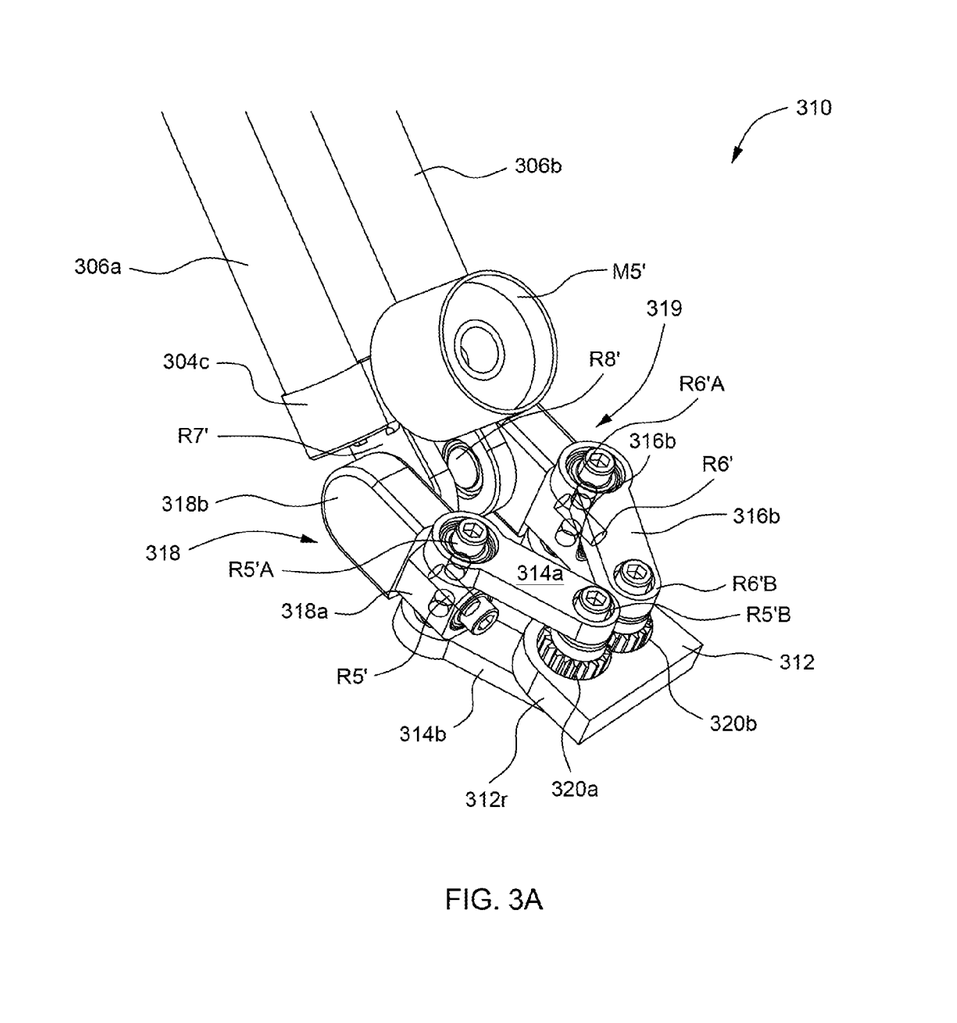
FIG. 3A depicts a wrist portion of the hybrid robotic manipulator as shown in FIG. 3.

The wrist 310 as shown in FIG. 3A, has a casing 312. The casing 312 has a plurality of gears (not shown) therein. The casing 312 further has a top portion 312*t*, a bottom portion 312*b*, a front portion 312*f* (not shown) and a rear portion 312*r*. Further, the wrist 310 includes a first coupling element 314 having a first top coupling element 314*a*, a first bottom coupling element 314*b*. The wrist 310 further includes a second coupling element 316 having a second top coupling element 316*a* and a second bottom coupling element 316*b*. At least a first gear and a second gear (not shown) are provided in the rear portion 312*r* of the casing 312. The first gear has a first gear shaft (not shown) for connecting the first gear to the top portion 312*t* and the bottom portion 312*b* of the casing 312 and the second gear has a second gear shaft (not shown) for connecting the second gear to the top portion 312*t* and the bottom portion 312*b* of the casing 312. Further, each of the first and second gears has an axis of rotation along the respective first and second gear shafts and the axis of rotation of first gear is parallel to the axis of rotation of the second gear. The first and second gears provided in the rear portion 312r mesh with each other to transmit motion.

A first end of the first top coupling element 314a is fastened to the first gear shaft at the top portion 312t of the casing 312. A first end of the first bottom coupling element 314b is fastened to the first gear shaft at the bottom portion 312b of the casing 312. Similarly, a first end of the second top coupling element 316a is fastened to the second gear shaft at the top portion 312t of the casing 312 and a first end of the second bottom coupling element 316b is fastened to the second gear shaft at the bottom portion 312b of the casing 312.

Further, the front portion 312f (not shown) of the casing 312 is connected to an end effector E3 (not shown).

The wrist 310 further includes a first locking element 318, having a head part 318a and a tail part 318b, and a second locking element 319 having a head part 319a and a tail part 319b. The head part 318a of the first locking element 318 is pivotally engaged between a second end, which is spaced away from the first end, of the first top coupling element 314a and a second end, which is spaced away from the first end, of the first bottom coupling element 314b. Similarly, the head part 319a of the second locking element 319 is pivotally engaged between a second end, which is spaced away from the first end, of the second top coupling element 316a and a second end, which is spaced away from the first end, of the second bottom coupling element 316b. The tail part 318b of the first locking element 318 is adapted to be engaged with the connecting element 304c and the tail part 319b of the second locking element 319 is adapted to be engaged with the connecting element 306c.

The tail part 318b of the locking element 318 and the connecting element 304c are connected to each other by a revolute joint R7. An axis of rotation of the revolute joint R7 is substantially parallel to the axis of rotation of the revolute joint R3. Similarly, the tail part 319b of the locking element 319 and the connecting element 306c are connected to each other by a revolute joint R8. An axis of rotation of the revolute joint R8 is substantially parallel to the axis of rotation of the revolute joint R4. Further, a motor M5 is provided in the proximity of the revolute joints R7 and R8 for actuating a motion of the wrist.

It will be understood by a person having ordinary skill in the art that the first top 314a and bottom 314b coupling elements may be provided as a unitary member without deterring the intended function as indicated hereinabove. For example, a coupling element having a shape substantially similar to that of a double open-end wrench/spanner may be used in place of the first top 314a and bottom 314b coupling elements. Similarly, the second top 316a and bottom 316b coupling elements may be provided as a unitary member.

Further, the end effector E3 may have different shapes based on the shape and size of the object to be located in a workspace and/or based on the nature of the operation performed by the manipulator 300.

Further, movements associated with the wrist 310 and end effector E3 are explained as non-limiting examples hereunder. In operation, the motor M0 actuates a rotational movement of the Link W which in turn rotates the arm 304, the arm 306, the wrist 310 and the end effector E3. In order for the wrist 310 and the end effector E3 to define a yawing movement i.e., turning of the wrist 310 from left to right and vice versa, one of the motor M1 and M2 is actuated to move the corresponding upper arm link 304a and 306a. In this example, the motor M1 is considered to actuate the corresponding upper arm link 304a. The upper arm link 304a is thereby made to rotate about the axis of the revolute joint R1. The rotation of the upper arm link 304a causes the corresponding fore arm link 304b to move. Alternatively, the motor M3 may be actuated to move the fore arm link 304b. During the movement of the upper arm link 304a and the fore arm link 304b, the arm 306 remains stationary or may have substantially less movement as compared to the movement of the arm 304. Further, the movement of the fore arm link 304b moves the locking element 319 forward which in turn moves the coupling element 316 away from the coupling element 314. The movement of the coupling element 316 in turn moves the wrist 310 towards the arm 306 thus resulting in a yawing movement of the wrist 310 and the end effector E3.

Further, in order for the end effector E3 to define a pitching movement i.e., tilting of the end effector E3 forward and backward or up and down with respect to the wrist 310, the motor M5 is used. The motor M5 actuates a movement of the tail part 318b and the tail part 319b of the respective locking elements 318 and 319. The movement of the tail parts 318b and 319b in turn moves the coupling elements 314 and 316 forward and backward or up and down as desired thus defining the pitching motion of the wrist 310.

In order for the wrist 310 to define a rolling movement i.e., tilting of the wrist 310 along with the end effector E3 from side to side, one or both of the connecting elements 304c and 306c rotates about the axis of the respective revolute joint R5 and R6. The rotation of the connecting elements 304c and 306c results in the wrist 310 being tilted in the desired direction and thus defining the rolling movement.

Further, it is also within the scope of the invention to actuate a movement of each of the wrist 210 and 310 by a cable or a steel rope, thereby eliminating the need for mounting the motors M5 and M5 on the wrists 210 and 310 or in proximity to the wrists 210 and 310. One example where the wrists 210 and 310 may be actuated by a cable is when the manipulator is used in extreme environment such as placing and retrieving parts from ovens.

Further, it has to be noted that, since the motors M0, M1, M2, M3, M4 and M0, M1, M2, M3, M4 of the manipulators 200 and 300 are located in the proximity to the respective bases 202 and 302, the mass of the motors does not contribute to power usage while the manipulator is in motion. Further, the location of the motors in proximity to the base provides weight balance, and, therefore, avoids tipping of the manipulator. Further, the motors M3 and M4 may be provided between the upper portion L2 and the lower portion L1 of the link L. Similarly, the motors M3 and M4 may be provided between the upper portion W2 and the lower portion W1 of the link W. It should be noted that providing the motors in proximity to the base is covered within the scope of the invention. Further, each of the motors M5 and M5 are preferably small motors when compared with the other motors. The motors M1-M4 contribute in parallel to a motion of the payload and hence the motors M1-M4 may be of a smaller size and capacity.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A hybrid robotic manipulator adapted to move objects, said manipulator comprising:
   a base;
   a waist mounted on the base and configured to rotate on the base; and
   a pair of arms mounted on the waist, each arm comprising:
      an upper arm coupled to the waist, wherein the pair of arms is mounted on the waist using a revolute joint configured to rotate the upper arm at an axis transverse to a central axis of the base and wherein the pair of arms is parallel to each other;
      a forearm serially coupled to the upper arm at an elbow; and
      a wrist configured to couple the pair of arms at a distal end through a pair of connecting elements mechanically coupled to each other, wherein the wrist further includes an end-effector mounted thereon and configured to grip the object and move the object to a desired position.

2. The hybrid robotic manipulator of claim 1, wherein the pair of connecting elements is coupled to each other by a plurality of gears.

3. The hybrid robotic manipulator of claim 2, wherein the plurality of gears is located in the wrist.

4. The hybrid robotic manipulator of claim 2, wherein the plurality of gears is configured to rotate at an axis transverse with respect to each other.

5. The hybrid robotic manipulator of claim 1, wherein movement of the upper arm and the forearm of each of the pair of arms is controlled by a plurality of motors.

6. The hybrid robotic manipulator of claim 1, wherein the plurality of motors is positioned near the revolute joint.

7. A hybrid robotic manipulator adapted to move objects, said manipulator comprising:
   a base;
   a waist mounted on the base and configured to rotate on the base; and
   a pair of moveable arms mounted on the waist, each arm comprising:
      an upper arm coupled to the waist;
      a forearm serially coupled to the upper arm at an elbow, wherein movement of the upper arm and the forearm of each pair of arms is actuated by a plurality of motors, wherein the plurality of motors is positioned near a plurality of revolute joints; and
      a wrist configured to couple the pair of arms at a distal end through a pair of connecting elements; wherein the wrist further includes:
      an end-effector mounted thereon and configured to clasp the object and move the object to a desired position; and
      a plurality of gears configured to couple the pair of connecting elements.

* * * * *